(12) United States Patent
Sandercock

(10) Patent No.: US 10,105,913 B2
(45) Date of Patent: Oct. 23, 2018

(54) WIND TURBINE BLADES AND METHOD OF MANUFACTURING THE SAME

(71) Applicant: Vestas Wind Systems A/S, Aarhus N. (DK)

(72) Inventor: Stephen Sandercock, Ryde (GB)

(73) Assignee: Vestas Wind Systems A/S, Aarhus N. (DK)

( * ) Notice: Subject to any disclaimer, the term of this patent is extended or adjusted under 35 U.S.C. 154(b) by 610 days.

(21) Appl. No.: 14/646,219

(22) PCT Filed: Nov. 18, 2013

(86) PCT No.: PCT/DK2013/050387
§ 371 (c)(1),
(2) Date: May 20, 2015

(87) PCT Pub. No.: WO2014/079456
PCT Pub. Date: May 30, 2014

(65) Prior Publication Data
US 2015/0316027 A1    Nov. 5, 2015

Related U.S. Application Data

(60) Provisional application No. 61/728,268, filed on Nov. 20, 2012.

(30) Foreign Application Priority Data

Nov. 20, 2012  (DK) ................................. 2012 70722

(51) Int. Cl.
*B29C 70/52* (2006.01)
*B29C 70/54* (2006.01)
(Continued)

(52) U.S. Cl.
CPC .............. *B29C 70/52* (2013.01); *B29C 65/70* (2013.01); *B29C 70/543* (2013.01);
(Continued)

(58) Field of Classification Search
CPC ......... B29C 65/48; B29C 70/34; B29C 70/48; B29C 70/52; B29C 70/523; B29C 70/525;
(Continued)

(56) References Cited

U.S. PATENT DOCUMENTS 4,402,813 A * 9/1983 Kircher .................. C25B 11/02
204/257
4,474,536 A * 10/1984 Gougeon .............. F03D 1/0675
144/346

(Continued)

FOREIGN PATENT DOCUMENTS

WO           03008800 A1    1/2003

OTHER PUBLICATIONS

Danish Patent and Trademark Office, Search Report issued in Application No. PA 2012 70722 dated Jun. 20, 2013.
(Continued)

*Primary Examiner* — Matthew J Daniels
*Assistant Examiner* — Andrew D Graham
(74) *Attorney, Agent, or Firm* — Wood Herron & Evans LLP

(57) ABSTRACT

Method of making a spar cap includes: providing a plurality of composite strips, each strip being of constant cross section defined by first and second sides and edges, the first and second sides comprising first and second abutment surfaces, the strip being of uniform thickness between the abutment surfaces, a first edge region of the strip comprising a first edge being of relatively reduced thickness, the first side of the strip comprising an edge surface, and the strip having a peel ply layer at least partially covering the first
(Continued)

abutment surface and the edge surface; removing the peel ply layers; stacking the strips such that the first abutment surface abuts an abutment surface of an adjacent strip to define an interface region, such that a clearance region is defined; supplying resin to the respective clearance regions and causing the resin to infiltrate into the interface regions; and curing the resin.

15 Claims, 4 Drawing Sheets

(51) Int. Cl.
    *B29C 65/70* (2006.01)
    *B32B 3/26* (2006.01)
    *B32B 3/02* (2006.01)
    *B29D 99/00* (2010.01)
    *F03D 1/06* (2006.01)
    *F03D 13/10* (2016.01)

(52) U.S. Cl.
    CPC .......... *B29C 70/546* (2013.01); *B29C 70/547* (2013.01); *B29D 99/0007* (2013.01); *B29D 99/0028* (2013.01); *B32B 3/02* (2013.01); *B32B 3/263* (2013.01); *F03D 1/0675* (2013.01); *F03D 13/10* (2016.05); *B32B 2603/00* (2013.01); *Y02E 10/721* (2013.01); *Y02P 70/523* (2015.11); *Y10T 29/49339* (2015.01); *Y10T 428/24488* (2015.01)

(58) Field of Classification Search
    CPC .... B32B 3/02; B32B 3/06; B32B 3/26; F03D 1/0675; F03D 1/0683
    USPC .................................................. 264/642, 643
    See application file for complete search history.

(56) References Cited

U.S. PATENT DOCUMENTS

| | | | | |
|---|---|---|---|---|
| 4,812,343 | A * | 3/1989 | Kiekhaefer | B29C 70/085 264/122 |
| 5,403,062 | A * | 4/1995 | Sjostedt | B62D 33/046 220/1.5 |
| 5,438,171 | A * | 8/1995 | Schmanski | B29C 70/525 181/210 |
| 5,480,706 | A * | 1/1996 | Li | B29C 70/08 428/113 |
| 5,490,892 | A * | 2/1996 | Castagnos | B29C 37/0082 156/148 |
| 5,556,496 | A * | 9/1996 | Sumerak | B29C 70/525 156/166 |
| 5,678,715 | A * | 10/1997 | Sjostedt | B65D 88/121 220/1.5 |
| 5,705,795 | A * | 1/1998 | Anderson | B29C 66/73116 156/274.4 |
| 5,783,013 | A * | 7/1998 | Beckman | B29C 70/523 156/166 |
| 5,829,215 | A * | 11/1998 | Billing | E02D 29/14 428/159 |
| 2003/0129061 | A1 * | 7/2003 | Finn | B23P 15/04 416/224 |
| 2004/0154684 | A1 | 8/2004 | Baudonnel | |
| 2004/0175524 | A1 | 9/2004 | Gerez et al. | |
| 2004/0213952 | A1 * | 10/2004 | Takemura | B29C 70/34 428/105 |
| 2004/0253114 | A1 * | 12/2004 | Gunneskov | F03D 1/065 416/224 |
| 2007/0175573 | A1 * | 8/2007 | Fox | B29C 70/34 156/196 |
| 2008/0069699 | A1 * | 3/2008 | Bech | B29C 66/20 416/229 R |
| 2008/0159871 | A1 * | 7/2008 | Bech | F03D 1/065 416/229 R |
| 2009/0165411 | A1 * | 7/2009 | Schiffmann | B29C 44/1285 52/309.1 |
| 2009/0220747 | A1 * | 9/2009 | Karem | B29C 70/545 428/172 |
| 2009/0273111 | A1 * | 11/2009 | Bansal | B29C 70/443 264/101 |
| 2010/0015405 | A1 * | 1/2010 | Bechtold | B29C 37/0075 428/174 |
| 2010/0068450 | A1 * | 3/2010 | Lloyd | B32B 3/02 428/99 |
| 2010/0135815 | A1 * | 6/2010 | Bagepalli | F03D 1/0675 416/226 |
| 2010/0189973 | A1 * | 7/2010 | Mikkelsen | B29C 70/443 428/213 |
| 2011/0052408 | A1 * | 3/2011 | Zuteck | B29C 70/22 416/241 R |
| 2011/0081247 | A1 * | 4/2011 | Hibbard | F03D 1/0675 416/226 |
| 2011/0116935 | A1 * | 5/2011 | Wansink | B29C 66/721 416/229 R |
| 2011/0135485 | A1 * | 6/2011 | Wang | F03D 1/0675 416/226 |
| 2011/0143081 | A1 * | 6/2011 | Fritz | B29C 70/30 428/77 |
| 2011/0204611 | A1 * | 8/2011 | Ziegler | B29C 70/521 280/781 |
| 2011/0221093 | A1 * | 9/2011 | Perrow | B29C 70/44 264/255 |
| 2012/0027609 | A1 | 2/2012 | Ogde et al. | |
| 2012/0034094 | A1 * | 2/2012 | Wansink | B29D 99/0025 416/230 |
| 2012/0049702 | A1 * | 3/2012 | DiFonzo | B29C 53/562 312/223.2 |
| 2012/0082547 | A1 * | 4/2012 | Baker | F03D 1/0675 416/1 |
| 2013/0149521 | A1 * | 6/2013 | Nelson | B29C 70/081 428/221 |
| 2013/0189114 | A1 * | 7/2013 | Jenzewski | B29C 70/443 416/229 R |
| 2015/0377210 | A1 * | 12/2015 | Bech | B24B 9/20 416/230 |

OTHER PUBLICATIONS

European Patent Office, International Search Report and Written Opinion issued in International Application No. PCT/DK2013/050387 dated Feb. 6, 2014.

* cited by examiner

WIND TURBINE BLADES AND METHOD OF MANUFACTURING THE SAME

TECHNICAL FIELD

The present invention relates generally to rotor blades for wind turbines and to methods of manufacturing wind turbine blades. More specifically, the present invention relates to wind turbine blades that include a stack of load-bearing reinforcing strips integrated within the structure of the shell, and to a method of making such blades.

BACKGROUND

FIG. 1 is a cross-sectional view of a wind turbine rotor blade 10. The blade 10 has an outer shell 12, which is fabricated from two half shells: a leeward shell 14 and a windward shell 16. The shells 14, 16 are moulded from glass-fibre reinforced plastic (GRP). Parts of the outer shell 12 are of sandwich panel construction and comprise a core 18 of lightweight foam (e.g. polyurethane), which is sandwiched between inner and outer GRP layers 20, 22 or 'skins'.

The blade 10 comprises first and second pairs of spar caps 24, 26, 28, 30 arranged between sandwich panel regions of the outer shell 12. One spar cap of each pair 24, 28 is integrated with the windward shell 16 and the other spar cap of each pair 26, 30 is integrated with the leeward shell 14. The spar caps 24, 26, 28, 30 of the respective pairs are mutually opposed and extend longitudinally along the length of the blade 10. A first longitudinally-extending shear web 32 bridges the first pair of spar caps 24, 26 and a second longitudinally-extending shear web 34 bridges the second pair of spar caps 28, 30. The shear webs 32, 34 in combination with the spar caps 24, 26, 28, 30 form a pair of I-beam structures, which transfer loads effectively from the rotating blade 10 to the hub of the wind turbine (not shown). The spar caps 24, 26, 28, 30 in particular transfer tensile and compressive bending loads, whilst the shear webs 32, 34 transfer shear stresses in the blade 10.

Each spar cap 24, 26, 28, 30 has a substantially rectangular cross section and is made up of a stack of prefabricated reinforcing strips 36. The strips 36 are pultruded strips of carbon-fibre reinforced plastic (CFRP), and are substantially flat and of rectangular cross section. The number of strips 36 in the stack depends upon the thickness of the strips 36 and the required thickness of the shell 12, but typically there may be between four and twelve strips 36 in the stack. The strips 36 have a high tensile strength, and hence have a high load bearing capacity.

The strips 36 are formed by pultrusion, a continuous process similar to extrusion, in which fibres are pulled through a supply of liquid resin and through dies that shape the strip 36. The resin is then cured, for example by heating in an open chamber, or by employing heated dies that cure the resin as the strip 36 is pultruded.

The so-called 'structural shell design' shown in FIG. 1 in which the spar caps 24, 26, 28, 30 are integrated within the structure of the outer shell 12 avoids the need for a separate spar cap such as a reinforcing beam, which is typically bonded to an inner surface of the shell in many conventional wind turbine blades. Other examples of rotor blades having a structural shell design are described in EP 1 520 983, WO 2006/082479 and UK patent application number 1121649.6.

The wind turbine blade shown in FIG. 1 is made using a resin-infusion (RI) process, whereby the various laminate layers of the shell 12 are laid up in a mould cavity, and a vacuum is applied to the cavity. Resin is then introduced to the mould, and the vacuum pressure causes the resin to flow over and around the laminate layers and to infuse into the interstitial spaces between the layers. To complete the process, the resin-infused layup is cured to harden the resin and bond the various laminate layers together to form the blade.

The pultruded reinforcing strips described above tend to have a relatively smooth and flat outer surface, which is a feature of the pultrusion process. As a result, when the strips are stacked one on top of the other in the mould, there is very little space at the interfaces between the strips. This lack of space makes it difficult for resin to infuse between the strips, and can result in a poor bond forming between the strips. If the strips are not properly bonded together, then there is a risk of delamination occurring in the blade structure, which may lead to failure of the blade in use. This problem is not limited to pultruded strips, but may also exist when other types of reinforcing strips having a smooth outer surface are stacked.

One known method for obtaining a surface that is more suitable for bonding is to provide a 'peel ply' 38 on the pultruded reinforcing strip as illustrated in FIG. 2a, which can be removed to form a roughened surface 40 as shown in FIG. 2b. Such peel plies 38 are typically made of a woven fabric such as polyamide. During the pultrusion process, the peel ply 38 is drawn through a die together with the fibres and the resin. The peel ply 38 is cured onto the surface of the reinforcing strip 36 as the resin is cured. When the peel ply 38 is removed, it removes a layer of cured resin from the surface of the strip 36, thereby providing a roughened surface 40 that is free from contamination. The roughened surface 40 provides space at the interface between the stacked strips 36, allowing resin to infiltrate between the strips 36, for example by capillary action.

However, in practice, peel ply 38 cannot be applied to the entire surface of a strip 36 during the pultrusion process. In particular, peel ply 38 cannot extend to the outermost edges of the surface, since the peel ply 38 would become caught in the machinery used in the pultrusion process. A peripheral region 42 of the strip 36 must therefore be left uncovered by the peel ply 38, as is shown in FIG. 2a. This peripheral region 42 lies flush with the peel ply surface 46, so that when the peel ply 38 is removed the peripheral region 42 lies above the roughened surface 40, as shown in FIG. 2b.

When the strips 36 are stacked, the peripheral regions 42 of neighbouring strips 36 contact one another. The smooth surfaces of the peripheral regions 42 mean that little space is left between the peripheral regions 42 of the strips 36, and resin cannot infiltrate between the surfaces at this area of contact. Thus, the area of contact between the peripheral regions 42 acts as a barrier that prevents resin infiltrating between the opposed roughened surfaces 40 of adjacent strips 36 in the stack. An insufficient quantity of resin is therefore dispersed between the strips 36, which reduces the strength of the interfacial bonds between strips 36, and can lead to delamination.

It is an object of the invention to mitigate or overcome this problem.

SUMMARY OF THE INVENTION

Against this background, the present invention provides a method of making a spar cap for a wind turbine blade, the method comprising:

(a) providing a plurality of elongate pultruded fibrous composite strips, each strip being of substantially constant cross section defined by first and second mutually opposed and longitudinally extending sides and by first and second longitudinal edges, the first and second sides comprising, respectively, first and second substantially planar abutment surfaces, the separation between the first and second sides defining the thickness of the strip, the strip being of substantially uniform thickness between the first and second abutment surfaces, a first edge region of the strip comprising a first edge of the strip being of relatively reduced thickness, the first side of the strip comprising an edge surface adjacent the first abutment surface in the first edge region of the strip, and the strip having a first peel ply layer at least partially covering the first abutment surface and at least partially covering the edge surface;

(b) removing the first peel ply layers from the respective strips;

(c) stacking the strips in a mould such that the first abutment surface of each strip faces an abutment surface of an adjacent strip in the stack to define an interface region between the strips, and such that a clearance region is defined between the first edge region of each strip and an edge region of an adjacent strip in the stack;

(d) supplying resin to the respective clearance regions and causing the resin to infiltrate into the interface regions between adjacent strips; and (e) curing the resin to bond the strips together.

In using at least one strip that comprises an edge region of reduced thickness to provide a clearance region between edge regions of adjacent strips, the present invention allows effective infiltration of resin into the interface region between adjacent strips, increasing the bond strength between neighbouring strips. This effective infiltration provides a strong bond between neighbouring strips in a stack, reducing the problem of delamination of the strips in the assembled spar cap.

The first abutment surface of each strip may abut an abutment surface of an adjacent strip in the stack to define the interface region between the strips. In another embodiment, an interlayer is disposed in the interface region between the first abutment surface of each strip and the abutment surface of the adjacent strip in the stack. The interlayer may be a glass fabric layer for example which is provided to aid resin infusion between the strips and to assist in air being removed from between the strips during a resin infusion process.

The respective strips may be of tapering thickness in the first edge region, such that when the strips are stacked in step (c), the clearance region becomes progressively narrower moving from the first edge towards the interface region. This may be achieved, for example, by arranging the edge surface such that it is inclined relative to the first abutment surface. In this way, the clearance regions define a funnel that encourages resin to move from the clearance region into the interstitial spaces between adjacent strips.

In one embodiment, the first edge is a longitudinal edge of the strip, so that resin need infiltrate only a short distance to cover the interface region between adjacent strips. In an alternative embodiment, the first edge is the transverse edge of the strip.

Each strip may also have a second edge region of relatively reduced thickness, the second edge region comprising a second edge of the strip, and step (c) of the method may comprise stacking the strips in the mould such that a clearance region is defined between the second edge region of each strip and an edge region of an adjacent strip in the stack. Providing a second edge region of relatively reduced thickness is advantageous, as it allows resin to infiltrate between the strips from two clearance regions.

In an embodiment of the invention, the first side of each strip comprises an edge surface between the second edge and the first abutment surface, the edge surface being inclined relative to the first abutment surface, and the first peel ply layer at least partially covers the edge surface, and step (b) of the method comprises removing the first peel ply layer from the edge surface. Providing a peel ply layer over the edge surface in this way allows a roughened surface to be created on the edge surface and the abutment surface when the peel ply layer is removed, further facilitating the infiltration of resin into the interface region.

In another embodiment, the second abutment surface of each strip is at least partially covered by a second peel ply layer, and step (b) of the method comprises removing the second peel ply layers from the respective strips to expose fibres on the respective second abutment surfaces; and step (c) of the method comprises stacking the strips in the mould such that the second abutment surface of each strip faces an abutment surface of an adjacent strip in the stack to define an interface region between the strips. Partially covering the second abutment surface of each strip with a peel ply layer, and removing the peel ply layer in this way provides a roughened surface on the second abutment surface, facilitating the infiltration of resin into the interface region.

Preferably, step (a) comprises forming the strips by a pultrusion process comprising drawing a bundle of resin-coated fibres and the first peel ply layer through a pultrusion die having a cross section corresponding to the cross section of the strip defined in step (a) above. The bundle of fibres may be supported by the first and second longitudinal edges during the pultrusion process. Forming the strip by a pultrusion process allows efficient and continuous production of the strips.

Preferably, step (c) comprises stacking the strips in a wind turbine blade mould. In this way, the spar cap can be integrated into the wind turbine blade as it is fabricated, allowing for a more efficient manufacturing process.

The invention extends to a wind turbine blade having a spar cap manufactured in accordance with the above method. The invention also extends to a wind turbine comprising the wind turbine blade, and further extends to a wind farm comprising a plurality of such wind turbines.

The spar cap comprises a plurality of pultruded fibrous composite strips as described above wherein the peel ply layers of the respective strips are removed. The strips are arranged in a stack such that a clearance region is defined between the first edge region of each strip and an edge region of an adjacent strip in the stack. Adjacent strips are bonded together by a layer of resin in an interface region between the strips. The layer of resin also at least partially filling the clearance region defined between the strips.

The invention provides a spar cap in which resin has infiltrated effectively into the interface region between strips, via the clearance region. The spar cap of the invention therefore has strong bonding between the strips, resulting in reduced delamination of the strips.

In one embodiment, the respective strips are of tapering thickness in the first edge region, such that the clearance region becomes progressively narrower moving from the first edge towards the interface region. In this way, the clearance regions define a funnel that encourages resin into the interface region between adjacent strips.

The clearance regions may be defined between longitudinal edges of adjacent strips in the stack. In this way, the resin need infiltrate only a short distance from the edge region of the strip to cover the interface region between adjacent strips.

The invention also resides in a pultruded fibrous composite strip for stacking with one or more similar strips to form a spar cap of a wind turbine blade, the strip being of substantially constant cross section defined by first and second mutually opposed and longitudinally extending sides and by first and second longitudinal edges, the first and second sides comprising, respectively, first and second substantially planar abutment surfaces, the separation between the first and second sides defining the thickness of the strip, the strip being of substantially uniform thickness between the first and second abutment surfaces, a first edge region of the strip comprising a first edge of the strip being of relatively reduced thickness, the first side of the strip comprising an edge surface adjacent the first abutment surface in the first edge region of the strip, and the strip having a first peel ply layer at least partially covering the first abutment surface and at least partially covering the edge surface.

When the peel ply layer is removed from a strip according to the invention, and the strip is stacked with one or more similar strips to form a spar cap, neighbouring edge regions of neighbouring strips define a clearance region, which provides means for effective infiltration of resin into the interface region between adjacent strips, increasing the bond strength between neighbouring strips.

The strip may be of tapering thickness in the first edge region. For example, the first edge may be chamfered in the first edge region. In this way, a clearance region provided by the strip when provided in a stack defines a funnel that encourages resin into the interface region between adjacent strips.

Optionally, a peripheral region of the first side adjacent the first edge is not covered by the first peel ply layer. In this embodiment of the invention, the first peel ply layer may lie flush with the peripheral region. This may be a feature of the manufacturing process, for example if the strip is manufactured by a pultrusion process.

Preferably, the edge surface is inclined relative to the first abutment surface.

Preferably, the first edge is the first longitudinal edge of the strip.

In one embodiment of the invention, the strip may have a second edge region of relatively reduced thickness. The second edge region comprises a second edge of the strip. In this embodiment, the strip may be of tapering thickness in the second edge region. For example, the second edge may be chamfered in the second edge region. In this way, resin may infiltrate from two edge regions into the interface region between the strips, such that the resin is required to infiltrate a shorter distance into the interface region.

The first side may comprise an edge surface between the second edge and the first abutment surface, and the first peel ply layer may at least partially cover said edge surface.

In one embodiment of the invention, a peripheral region of the first side adjacent the second edge is not covered by the first peel ply layer.

Preferably, the edge surface is inclined relative to the first abutment surface to provide the reduced thickness.

In any embodiment where the strip comprises two edge regions of reduced thickness, the second edge may be the second longitudinal edge of the strip.

The second abutment surface of the strip may be at least partially covered by a second peel ply layer. In one embodiment of the invention, the second side comprises an edge surface between the first edge and the second abutment surface, and the second peel ply layer at least partially covers said edge surface. Partially covering the second abutment surface of each strip with a peel ply layer means that the peel ply layer can be removed to provide a roughened surface on the second abutment surface, facilitating the infiltration of resin into the interface region. In this embodiment, a peripheral region of the second side adjacent the first edge may not be covered by the second peel ply layer. Optionally, the edge surface may be inclined relative to the second abutment surface.

The second side may also comprise an edge surface between the second edge and the second abutment surface, and the second peel ply layer at least partially covers said edge surface. In this embodiment a peripheral region of the second side adjacent the second edge may not be covered by the second peel ply layer. In one embodiment, the edge surface is inclined relative to the second abutment surface.

The invention extends still further to a method of making a strip as described above. The method comprises drawing a bundle of resin-coated fibres and the first peel ply layer through a pultrusion die having a cross section corresponding to the cross section of the strip.

This method provides an efficient way of forming a strip in accordance with the invention in a continuous process. Shaping the die such that its cross section corresponds to the cross section of the strip of the invention means that no further manufacturing steps are required after the strip has been pultruded.

In one embodiment, the strip has peel ply layers on both sides, and the method further comprises drawing the second peel ply layer through the pultrusion die, wherein the bundle of fibres is arranged between the first and second peel ply layers. In this way, the second peel ply layer can be arranged on the second side of the strip, without the need for additional stages in the manufacturing process.

BRIEF DESCRIPTION OF THE DRAWINGS

FIGS. 1, 2a and 2b have already been described above by way of background to the present invention. In order that the invention may be more readily understood, specific embodiments of the invention will now be described, by way of example only, with reference to the following drawings in which:

FIG. 3b is a partial plan view of the section of the pultruded fibrous composite strip of FIG. 3a;

DETAILED DESCRIPTION

A pultruded fibrous composite strip typically has a thickness of approximately 5 mm, and a peel ply layer typically has a thickness of approximately 50 to 500 microns. It will be appreciated that the drawings provided are not scale representations, and particular features of the strip have been greatly exaggerated for illustrative purposes.

Figure 1:
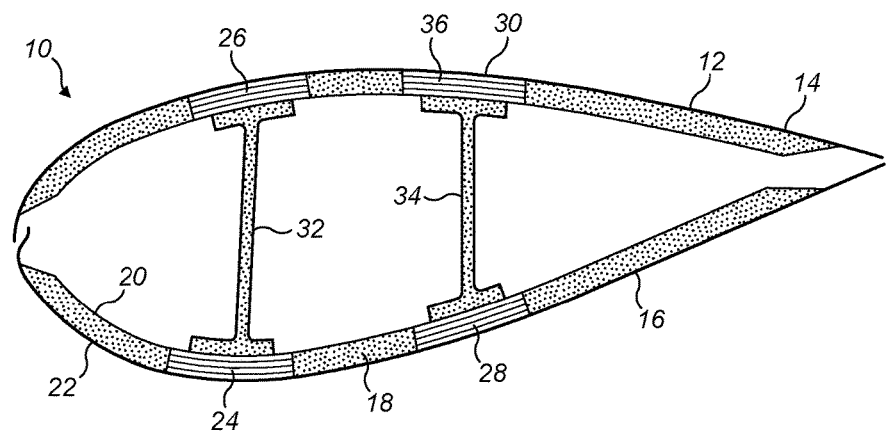
Figure 2A:
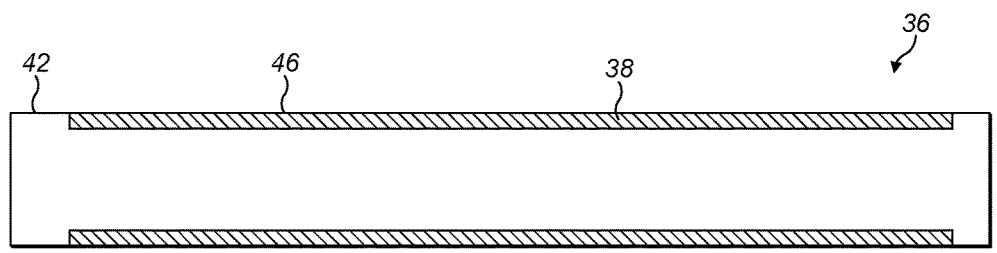
Figure 2B:
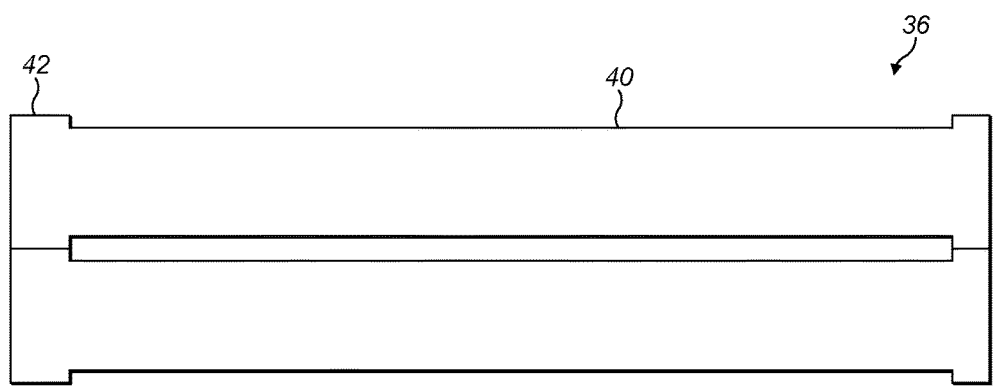
Figure 3A:
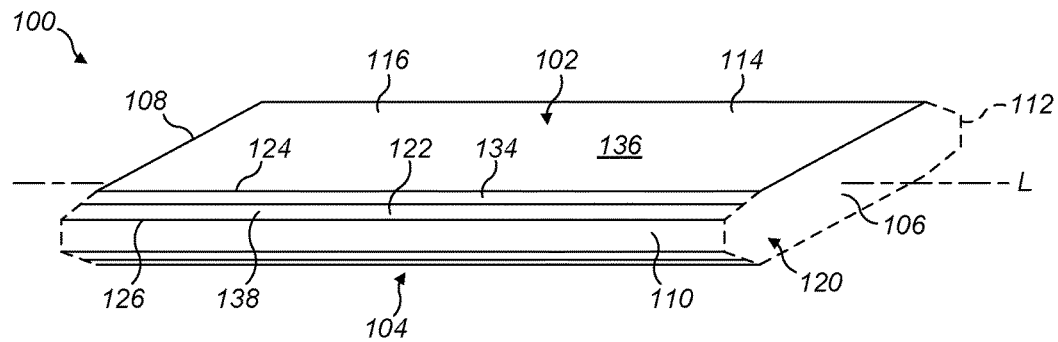
FIG. 3a is a partial perspective view of a section of a pultruded fibrous composite strip having a peel ply layer on both sides of the strip in accordance with a first embodiment of the present invention.
Figure 3B:
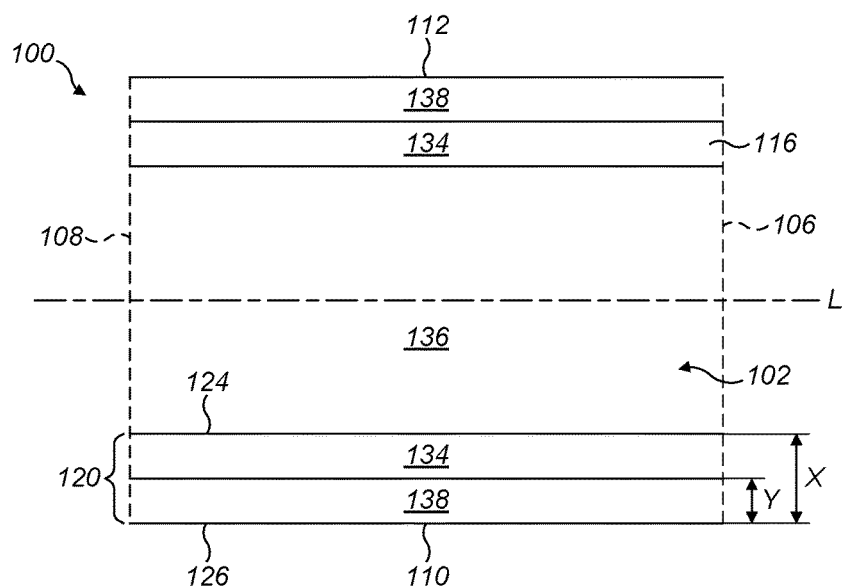
Figure 4A:
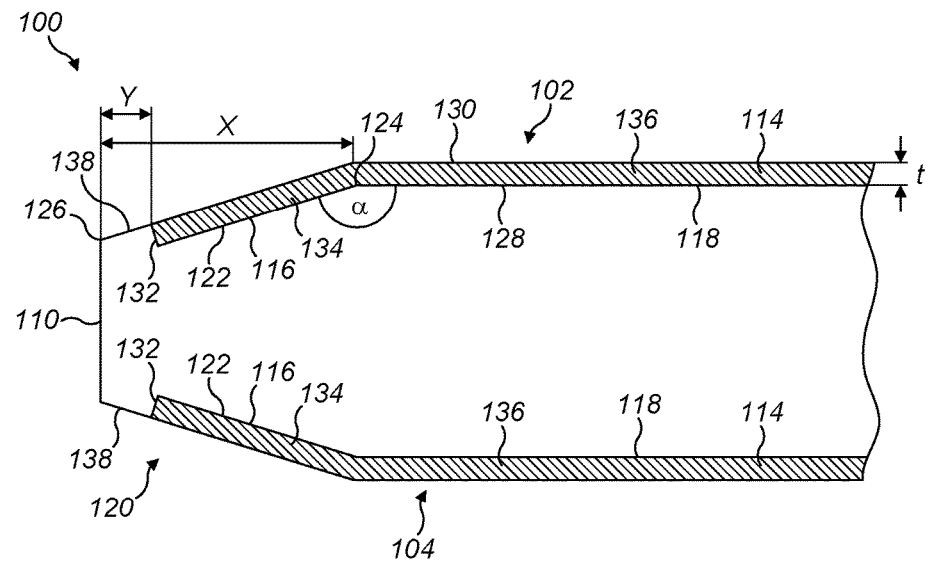
FIG. 4a is a partial cross-section of the pultruded fibrous composite strip of FIGS. 3a and 3b.

FIGS. 3a, 3b and 4a show a pultruded fibrous composite strip 100 for stacking with one or more similar strips to make a spar cap for a wind turbine blade. The strip 100 is made of a fibre-reinforced plastic, and comprises unidirectional carbon fibres aligned in a resin matrix.

Figure 4B:
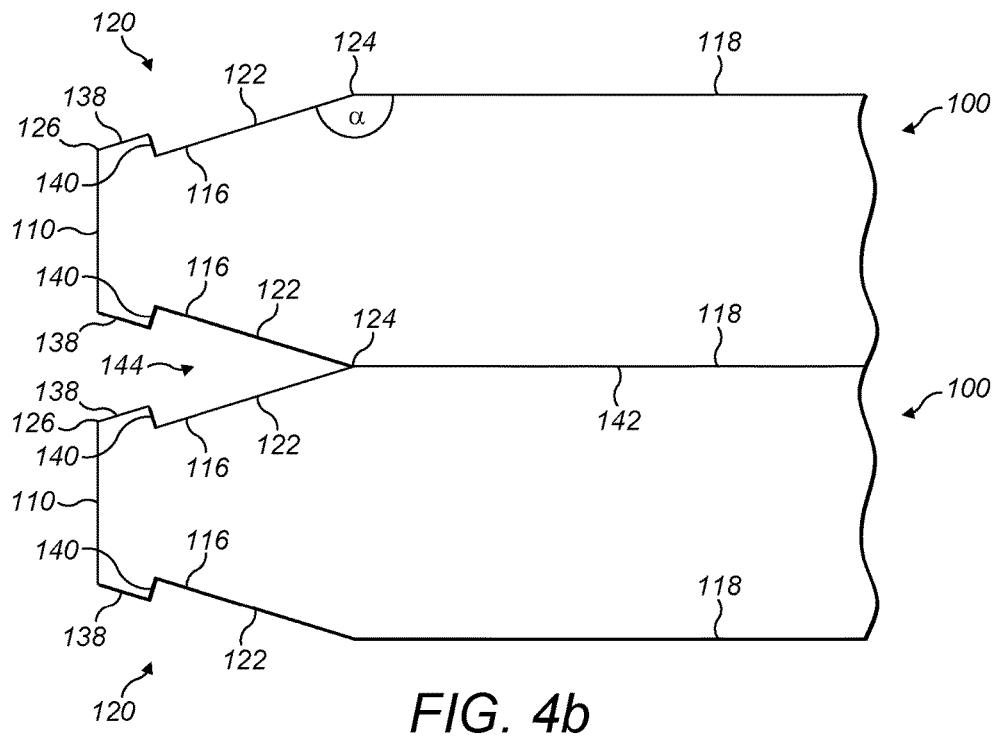
FIG. 4b is a partial cross-section of the strip of FIGS. 3a and 3b arranged in a stack with an identical strip, and with the peel ply layers removed.

The strip 100 is shaped substantially as a flat cuboid extending along a longitudinal axis L, the cuboid having a length substantially greater than its thickness or width. The strip 100 comprises first and second sides 102, 104 that extend longitudinally. The sides 102, 104 are joined by opposed transverse edges 106, 108 that are substantially perpendicular to the longitudinal axis L, and by opposed longitudinal edges 110, 112 that are aligned with the longitudinal axis L. Each side 102, 104 is at least partially covered by a peel ply layer 114 that can be removed to expose a roughened surface 116 on the respective side 102, 104 as shown in FIG. 4b.

The spacing between the sides 102, 104 defines the thickness of the strip 100. The majority of the strip 100 is of substantially uniform thickness. In this way, the majority of each side 102, 104 is substantially flat. This flat majority of the strip 102, 104 defines an abutment surface 118. When the strip 110 is arranged in a stack, this abutment surface 118 abuts a facing abutment surface 118 of a neighbouring strip 100. Because the majority of the side 102, 104 is formed by the abutment surface 118, a large area of contact is provided between neighbouring strips 100. Maximising the area of contact in this way increases the strength of the bond between the neighbouring strips 100.

As most clearly shown in FIGS. 3a and 4a, the strip 100 comprises an edge region 120 that includes one of the longitudinal edges 110 of the strip 100. The edge region 120 extends along the length of the longitudinal edge 110, and extends an orthogonal distance X into the strip 100 from the longitudinal edge 110. The edge region 120 of the strip 100 comprises an edge surface 122 that lies adjacent the abutment surface 118. This edge surface 122 extends between an edge 124 of the abutment surface 118 and a top corner 126 of the longitudinal edge 110, and features a step 140, which is explained in more detail later.

The edge region 120 of the strip 100 is of reduced thickness relative to the majority of the strip 100. Specifically, the edge region 120 of the strip 100 is of tapering thickness, such that the edge surface 122 is inclined with respect to the abutment surface 118. The edge surface 122 meets the abutment surface 118 at an internal angle α, which is less than 180°, and greater than 90°. The size of the angle α may be determined in relation to other parameters of the strip 100, as will be further discussed, but is typically between 172° and 178°.

In the embodiment shown, a peel ply layer 114 is arranged on each of the upper and lower sides 102, 104, such that each peel ply layer 114 at least partially covers its respective side 102, 104. The peel ply layer 114 may be made from any suitable material such as coated or uncoated polyamide, fibreglass fabric or nylon. The peel ply layer 114 has a thickness t that is between approximately 50 microns and approximately 500 microns, and is preferably 150 microns.

The peel ply layer 114 also comprises parallel edges 132 that extend longitudinally, and are aligned with the longitudinal axis (FIG. 3a) of the strip 110.

The upper peel ply layer 114 covers the abutment surface 118 of the upper side 102, and extends partially into the edge region 120 to cover part of the edge surface 122 of the upper side 102. In this way, the peel ply layer 114 extends over the interface 124 between the abutment surface 118 and the edge surface 122. An edge portion 134 of the peel ply layer 114, partially covering the edge surface 122 of the strip 100, is therefore inclined with respect to a central portion 136 of the peel ply layer 100, covering the abutment surface 118 of the strip 100.

Due to the pultrusion process previously described, the peel ply layer 114 cannot extend over the entirety of the edge surface 122. Put another way, the peel ply layer 114 stops short of the longitudinal edge 110 of the strip 100, so as to define a peripheral region 138 of the side 102, 104 that is not covered by the peel ply layer 114.

The peripheral region 138 is located on the edge surface 122 of the strip 100, and lies adjacent to the longitudinal edge 110 of the strip 100. The peripheral region 138 extends between the upper corner 126 of the longitudinal edge of the strip 100, and an edge 132 of the peel ply layer 114. The peripheral region 138 extends into the strip 100 an orthogonal distance Y from the longitudinal edge 110 of the strip 100. Longitudinally, the peripheral region 138 extends along the entire length of the strip 100.

Due to the pultrusion process, the peripheral region 138 of the edge surface 122 lies flush with an outer surface 130 of the peel ply layer 114. Thus, in the edge region 120 of the strip 100, the region of the edge surface 122 that is covered by the peel ply layer 114 lies inwardly of the peripheral region 138.

At the interface between the peripheral region 138 of the edge surface 122 and the portion of the edge surface 122 that is covered by the peel ply layer 114, the edge surface 122 comprises a step 140 as mentioned above. The step 140 comprises a wall that is approximately orthogonal to the edge surface 122 and has a height that is equal to the thickness t of the peel ply layer 114. Either side of the step 140, the edge surface 122 is inclined at the same gradient. When the peel ply layer 114 is arranged on the strip 100, the edge 132 of the peel ply layer 114 abuts the wall of the step 140.

It will be appreciated that, since the thickness t of the peel ply layer 114 is small (of the order of microns), the height of the step 140 is of a small magnitude. The step 140 shown in FIG. 4b is greatly exaggerated for illustrative purposes; in practice, the step 140 takes the form of a shallow indentation.

Thus, moving from the abutment surface 118 of the strip 100 to the longitudinal edge 110 of the strip 100 (i.e. from right to left as shown in FIG. 4a), the upper side 102 of the strip 100 is initially horizontal to define the abutment surface 118. The abutment surface 118 meets the edge surface 122 at an angle α, and the edge surface 122 tapers at a constant taper gradient such that it extends towards a central longitudinal plane of the strip 100. The edge surface 122 continues at the constant taper gradient until the step 140 in the edge surface 122. The step 140 in the edge surface 122 slopes steeply away from the central longitudinal plane of the strip 100, in a direction approximately orthogonal to the edge surface 122. The step height is equal to the thickness t of the peel ply layer 114. Beyond the step 140, the edge surface 122 continues into the peripheral region 138 at the same taper gradient. The peripheral region 138 of the edge surface 122 is inclined at the angle α to the abutment surface 118, and terminates at the longitudinal edge 110 of the strip 100.

In the embodiment shown, the lower, or second, side 104 of the strip 100 is a mirror-image of the upper side 102. Thus, all of the features described above in relation to the upper side 102 of the strip 100 apply to the lower side 104 of the strip 100. Hence the respective edge surfaces 122 of the strip 100 taper inwardly towards the longitudinal edge 110.

Before the strip 100 is arranged in a stack to form a spar cap, the peel ply layers 114 are removed from the upper and lower sides 102, 104. When a peel ply layer 114 is removed from a side 102, 104 of the strip 100, a portion of the cured resin is removed from that side 102, 104. This removal of the resin forms a rough texture on the abutment surface 118 and on the part of the edge surface 122 that was covered by the peel ply layer 114.

In the assembled spar cap, the strip 100, with the peel ply layer 114 removed, is arranged in a stack comprising similar strips 100, as shown in FIG. 4b. The abutment surface 118 of the strip 100 is arranged in abutment with a similar abutment surface 118 of a neighbouring strip 100 to define an interface region 142 between the strips 100. A thin layer of resin is interposed between adjacent strips 100 in the stack to bond the strips 100 together.

When the strips are stacked, the tapered edge regions of the respective strips mean that the peripheral regions 138 of adjacent strips are spaced apart from each other such that a clearance region 144 is defined between the edge regions 120 of the neighbouring strips 100. Because of the tapered thickness of the edge region 120, the clearance region 144 becomes progressively narrower moving from the first longitudinal edge 110 towards the interface region 142. Expressed in other terms, the clearance region 138 becomes progressively wider moving from the interface region 142 towards the first edge 110. In the assembled spar cap, this clearance region 144 is filled with resin.

In the embodiment shown, the neighbouring strip 100 is identical to the first strip 100. The clearance region 144 is therefore defined between the respective narrowed edge regions 102 of the neighbouring strips 100.

To make a spar cap from the strips 100, the peel ply layers 114 are removed from the desired number of strips 100, and the strips 100 are stacked in a mould such that their abutment surfaces 118 are aligned and abut one another. Resin is then introduced into the mould, and the resin infuses into the clearance regions 144 that are defined between neighbouring strips 100.

The narrowing of the clearance region 144 towards the interface region 142 of the strips 100 provides an advantageous funnel effect whereby a relatively large inlet for resin is created between adjacent stacked strips 100, and the tapering clearance region 144 serves to concentrate and guide the resin towards the interface region 142 between the strips 100.

The flow of resin into the interface regions 142 is also assisted by the roughened texture 116 of the abutment surfaces 118 and of the adjacent part of the edge surface 122, which gives rise to capillary action to enhance resin infusion.

After the resin has infiltrated into the interface region 142 between the strips 100, the resin is cured to bond the strips 100. The resin may be cured, for example, by heating the stack of strips 100.

The spar cap 146 may be made in a dedicated mould, so as to form a pre-cured spar cap 146 to be integrated into a wind turbine blade at a later stage. Alternatively, the spar cap 146 may be formed and integrated into the wind turbine blade simultaneously with the manufacture of the blade itself. A method of making a wind turbine blade in accordance with the present invention will now be described with reference to FIGS. 5a and 5b.

Figure 5A:
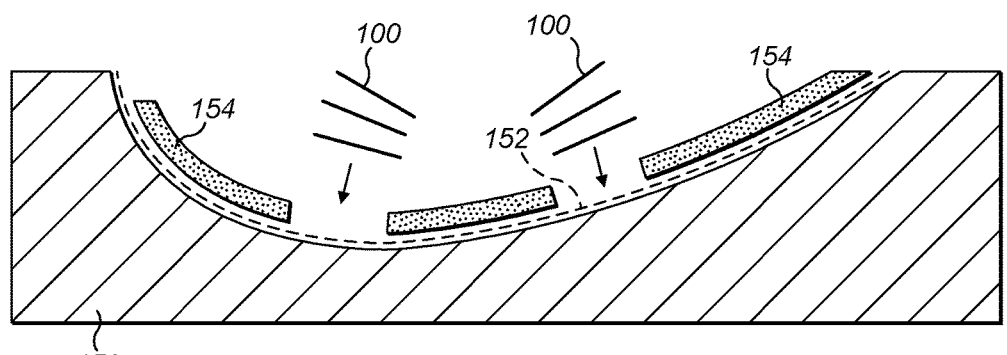
FIGS. 5a and 5b illustrate a method of manufacturing a wind turbine blade in accordance with the present invention.
Figure 5B:
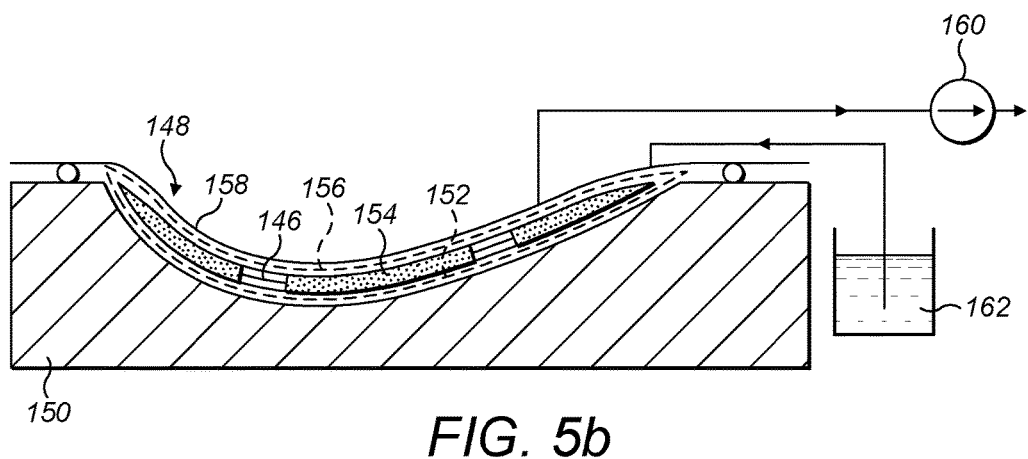

Referring to FIGS. 5a and 5b, the turbine blade comprises a windward shell 148 and a leeward shell (not shown), each manufactured in respective half-moulds 150. During manufacture of each shell 148, an outer skin 152 in the form of a dry fibre material is first placed on a surface of the half-mould 150. The strips 100 are then positioned in the mould 150.

Next, a layer of structural foam 154 is introduced into the half-mould 150 to fill the regions between the spar caps 146. An inner skin 156, in the form of a dry fibre material, is then placed on the upper surfaces of the spar caps 146 and the structural foam 154. The components are covered with an airtight bag 158 to form an evacuation chamber encapsulating all of the components.

The chamber is then evacuated using a vacuum pump 160. With the pump 160 still energised, a supply of liquid resin 162 is connected to the chamber, and resin flows into the chamber through a plurality of resin inlets, which are longitudinally spaced along the mould. Resin infuses throughout the mould in a generally chordwise direction. The resin infuses into the clearance regions 144 located between edge regions 120 of neighbouring strips 100. Resin is delivered to the clearance regions 144 along the entire length of each stack, and infuses between the strips 100 in each stack via the roughened surfaces 116. In this way, the resin need only infuse a relatively short distance in a direction extending from one longitudinal edge 110 of the strip 100 to the other longitudinal edge 112. Resin also infuses between other components in the half shell 148.

The pump 160 continues to operate during a subsequent moulding operation in which the mould 150 is heated so as to cure the resin, although during the curing process the vacuum pressure may be adjusted.

Shear webs are then attached to the inner skin 156 immediately above the spar caps 146 in the lower half-mould 150, and the upper free ends of the webs are coated with respective layers of adhesive.

The upper half-mould is then pivoted into position above the lower half-mould 150, such that the upper half-mould is upturned and placed on top of the lower half-mould 150. This causes the spar caps 146 within the upper half-mould to adhere to the upper free ends of the shear webs. The resilient nature of the webs gives rise to a biasing force of the webs against the upper spar caps 146 so as to ensure good adhesion.

The mould is then opened, and the finished turbine blade lifted from the mould. The resulting turbine blade is then incorporated into a wind turbine by known methods.

Each pultruded fibrous composite strip 100 is made by a pultrusion process in which resin-coated fibres are drawn through a die in a process direction together with a pair of peel ply layers 114. As the components are drawn through the die, the peel ply layers 114 are arranged so as to be located on respective upper and lower sides 102, 104 of the strip 100.

During the pultrusion process, an edge region 120 of the strip 100 is shaped such that its thickness is less than the thickness of the majority of the strip 100. This is achieved by shaping the die to reflect the desired cross section of the strip 100.

Specifically, the die has a cross section transverse to the process direction that is defined by opposed major faces that are joined by opposed minor faces. The spacing between the major faces defines the height of the die. The majority of the die is of substantially uniform height, while edge regions of the die, corresponding to the edge regions 120 of the strip 100, are of relatively reduced height compared to the majority of the die.

As the fibres and peel ply layers 114 are drawn through the die, the die shapes the fibres and peel ply layers 114 into the desired shape of the strip 100. As previously described, the peel ply layers 114 are arranged respectively on both sides 102, 104 of the strip 100, but do not extend to the longitudinal edges 110, 112 of the strip 100, so as to leave the fibres of the peripheral regions 138 uncovered. As the peel ply layers 114 and fibres are drawn through the die, they are shaped by the die, and lie against the die surfaces. The peel ply layers 114 and the fibres of the peripheral regions 138 of the strip 100 therefore lie flush with one another.

The die is heated as the components are drawn through it, so as to cure the strip 100 in a continuous pultrusion process. The peel ply layers 114 are cured into the resin on the sides 102, 104 of the strip 100. In this way, when the peel ply layers 138 are removed, a portion of the resin from the side 102, 104 of the strip 100 is removed, leaving a roughened texture as described above.

Many modifications may be made to the embodiments described above without departing from the scope of the invention as defined in the following claims.

Whilst in the example described above peel ply layers are arranged on each of the upper and lower sides, it will be appreciated that this need not be the case, and a peel ply layer may cover only the upper side, or only the lower side of the strip. Whilst in the example described above both the edge surface of the upper side, and the edge surface of the lower side are inclined with respect to the abutment surface, in an alternative embodiment of the invention only one of the respective edge regions may be inclined.

Furthermore, in the example described above the strip may comprise a single, first tapered edge region that comprises a first longitudinal edge. Alternatively, however, the strip may comprise first and second tapered edge regions, the first edge region comprising the first longitudinal edge and the second edge region comprising the second, opposed longitudinal edge. The second edge region may comprise all the features described with regard to the first edge region described above.

It is also envisaged that, alternatively or additionally, one or both transverse edges of the strip may be provided with reduced thickness as previously described. In this case the edge regions would additionally or alternatively comprise a transverse edge of the strip. In the stack of strips, clearance regions would then be provided between transverse edge regions, and resin would infuse into the interface region longitudinally.

In the embodiment of the spar cap described, each strip in the stack is a strip according to the invention, such that each strip comprises an edge region of relatively reduced thickness. However, this need not be the case, and embodiments are envisaged in which strips of substantially uniform thickness that do not comprise edge regions of relatively reduced thickness are also included in the stack. For example, strips of substantially uniform thickness may be interposed between strips having edge regions of relatively reduced thickness. In this way, clearance regions may still be defined between adjacent strips, such that resin can infiltrate between adjacent strips.

The invention claimed is:

1. A method of making a spar cap for a wind turbine blade, the method comprising:
   (a) providing a plurality of elongated pultruded fibrous composite strips, each strip being of essentially constant cross section taken transverse to a longitudinal axis of the strip and defined by first and second mutually opposed and longitudinally extending sides and by first and second longitudinal edges, the first and second sides comprising, respectively, first and second substantially planar abutment surfaces, a separation between the first and second sides defining a thickness of the strip, the strip being of essentially uniform thickness between the first and second abutment surfaces, a first edge region of the strip comprising a first edge of the strip being of relatively reduced thickness compared to a thickness of the strip between the first and second abutment surfaces, the first side of the strip comprising a first edge surface adjacent the first abutment surface in the first edge region of the strip, and the strip having a first peel ply layer at least partially covering the first abutment surface and at least partially covering the first edge surface;
   (b) removing the first peel ply layers from the plurality of strips;
   (c) stacking the strips in a mould such that the first abutment surface of each strip faces an abutment surface of an adjacent strip in the stack to define an interface region between the strips, and such that a clearance region is defined between the first edge region of each strip and an edge region of an adjacent strip in the stack;
   (d) supplying resin to the plurality of clearance regions and causing the resin to infiltrate into the interface regions between adjacent strips from the plurality of clearance regions; and
   (e) curing the resin to bond the strips together.

2. The method of claim 1, wherein the first abutment surface of each of the plurality of strips abuts an abutment surface of an adjacent strip in the stack to define the interface region between the strips.

3. The method of claim 1, wherein an interlayer is disposed in the interface region between the first abutment surface of each strip and the abutment surface of the adjacent strip in the stack.

4. The method of claim 1, wherein each of the plurality of strips is of tapering thickness in the first edge region, such that when the strips are stacked in step (c), the clearance region becomes progressively narrower moving from the first edge towards the interface region.

5. The method of claim 1, wherein the first edge surface is inclined relative to the first abutment surface.

6. The method of claim 1, wherein the first edge is a longitudinal edge of the strip.

7. The method of claim 1, wherein each strip has a second edge region of relatively reduced thickness, the second edge region comprising the second edge of the strip, and step (c) of the method comprises stacking the strips in the mould such that a clearance region is defined between the second edge region of each strip and an edge region of an adjacent strip in the stack.

8. The method of claim 7, wherein the first side of each strip comprises a second edge surface between the second edge and the first abutment surface, the second edge surface being inclined relative to the first abutment surface, and the first peel ply layer at least partially covers the second edge surface, and step (b) of the method comprises removing the first peel ply layer from the second edge surface.

9. The method of claim 1, wherein the second abutment surface of each strip is at least partially covered by a second peel ply layer, and step (b) of the method comprises removing the second peel ply layers from the respective strips to expose fibres on the respective second abutment surfaces; and step (c) of the method comprises stacking the strips in the mould such that the second abutment surface of each strip faces an abutment surface of an adjacent strip in the stack to define an interface region between the strips.

10. The method of claim 1, further comprising, prior to step (a), forming the strips by a pultrusion process comprising drawing a bundle of resin-coated fibres and the first peel ply layer through a pultrusion die having a cross section corresponding to the cross section of at least one of the plurality of strips taken transverse to a longitudinal axis thereof.

11. The method of claim 1, wherein step (c) comprises stacking the strips in a wind turbine blade mould.

12. The method of claim 1, wherein the first side of the strip comprises an outwardly extending step adjacent the first edge surface in the first edge region of the strip, wherein the first edge surface is arranged between the step and the first abutment surface.

13. The method of claim 12, wherein the step has a height that is essentially equal to a thickness of the first peel ply layer.

14. The method of claim 12, wherein the step is essentially orthogonal to the first edge surface.

15. The method of claim 1, wherein step (c) of the method comprises stacking the strips in the mould such that all of the strips stacked in the mould are aligned with each other.

\* \* \* \* \*